(12) United States Patent
Kim et al.

(10) Patent No.: US 11,292,170 B2
(45) Date of Patent: Apr. 5, 2022

(54) PROCESSING AIDS AND MASTERBATCHES FOR THE SAME

(71) Applicant: HANNANOTECH CO., LTD., Daejeon (KR)

(72) Inventors: Soo Wan Kim, Sejong (KR); Eun Kyoung Kim, Daejeon (KR); Dae Ho Lee, Gunpo (KR)

(73) Assignee: HANNANOTECH CO., LTD., Daejeon (KR)

( * ) Notice: Subject to any disclaimer, the term of this patent is extended or adjusted under 35 U.S.C. 154(b) by 205 days.

(21) Appl. No.: 16/738,084

(22) Filed: Jan. 9, 2020

(65) Prior Publication Data

US 2020/0139605 A1 May 7, 2020

Related U.S. Application Data

(63) Continuation-in-part of application No. 14/888,707, filed as application No. PCT/KR2015/007349 on Jul. 15, 2015, now abandoned.

(30) Foreign Application Priority Data

Oct. 16, 2014 (KR) ........................ 10-2014-0139658

(51) Int. Cl.
*B29C 48/00* (2019.01)
*B29C 48/04* (2019.01)
*C08L 27/20* (2006.01)
*C08L 27/16* (2006.01)
*B29K 27/00* (2006.01)

(52) U.S. Cl.
CPC ............ *B29C 48/022* (2019.02); *B29C 48/04* (2019.02); *C08L 27/16* (2013.01); *C08L 27/20* (2013.01); *B29K 2027/16* (2013.01); *C08L 2310/00* (2013.01)

(58) Field of Classification Search
CPC ......... B29C 48/00; B29C 48/04; C08L 27/20; C08L 27/16
USPC .......................................... 525/165; 524/427
See application file for complete search history.

(56) References Cited

U.S. PATENT DOCUMENTS

| 6,906,137 B2 * | 6/2005 | Oriani ..................... B29C 48/95 525/165 |
| 2004/0192818 A1 * | 9/2004 | Oriani ..................... C08L 23/04 524/284 |

\* cited by examiner

*Primary Examiner* — Deve V Hall
(74) *Attorney, Agent, or Firm* — STIP Law Group, LLC

(57) ABSTRACT

The present invention relates to a processing aid of a non-fluorinated melt-processable polymer and a masterbatch for a processing aid, features the inclusion of a processing aid comprising a fluoropolymer forming clustered secondary particles each having a particle size of 2 μm to 2 mm and being a combination of primary fluoropolymer particles each having a diameter of 0.02 μm to 0.5 μm, and may accelerate the elimination of melt fracture despite the omission of an interfacial agent and decrease extrusion load upon process to thereby enhance productability.

4 Claims, 6 Drawing Sheets

PROCESSING AIDS AND MASTERBATCHES FOR THE SAME

CROSS-REFERENCE TO RELATED APPLICATIONS

This application is a Continuation-In-Part (CIP) of application Ser. No. 14/888,707 filed on Nov. 3, 2015, which in turn claims benefit of International Application No. PCT/KR2015/007349 filed on Jul. 15, 2015 and Korean Patent Application No. 10-2014-0139658, filed on Oct. 16, 2014, in the Korean Intellectual Property Office, the disclosure of which is incorporated herein by reference in its entirety.

TECHNICAL FIELD

The present invention relates to processing aids, masterbatches for processing aids that are used upon extrusion of a non-fluorinated melt-processable polymer, and a method of extruding a non-fluorinated melt-processable polymer composition using the same. More specifically, the present invention relates to processing aids and masterbatches for processing aids that, even without including an interfacial agent, may shorten the melt fracture elimination time while slowing down die buildup and that, when processed, exhibit a decreased extrusion load to thereby enhance productability.

BACKGROUND

A quick extrusion process is required to achieve higher productability and cost savings in processing non-fluorinated melt-processable thermoplastic polymers. However, a non-fluorinated melt-processable polymer composition inevitably has a critical shear rate, the excess of which is a cause of a surface roughening, rendering it difficult to obtain a good formed product.

To address such issue while achieving an increased extrusion speed, it has been known to use a fluoropolymer as processing aid.

Korean Patent No. 1996-0000511 (published on Jan. 8, 1996) discloses a fluoropolymer processing aid for melt-processable polymers.

The fluoropolymer processing aid may enhance processability but consumes more melt fracture elimination time.

To accelerate the elimination of melt fracture, it is known to be preferable that the fluoropolymer processing aid is evenly dispersed in the non-fluorinated melt-processable polymer. Korean Patent No. 10-0870388 (published on Nov. 25, 2008) discloses a fluoropolymer processing aid that enhances dispersion of a fluoropolymer processing aid in a non-fluorinated melt-processable polymer.

The fluoropolymer processing aid includes an interfacial agent to reduce the melt fracture elimination time. It, however, may build up a die deposit that is attributed to a carbide created due to the low pyrolysis temperature of the interfacial agent.

PRIOR DOCUMENTS

Patent Documents (Patent Document 1) KR 1996-0000511 B1 published on Jan. 8, 1996.
(Patent Document 2) KR 10-0870388 B1 published on Nov. 25, 2008.

SUMMARY

In using a fluoropolymer as a processing aid for non-fluorinated melt-processable polymers, the prior art has focused on enhancing the degree of dispersing a fluoropolymer processing aid in the non-fluorinated melt-processable polymer using an interfacial agent. The use of interfacial agent may speed up melt fracture elimination but may cause die buildup.

An object of the present invention is to provide a processing aid for non-fluorinated melt-processable polymers and a masterbatch for the processing aid that, even without including an interfacial agent, may shorten melt fracture elimination time, suppress die buildup, and decrease extrusion load when processed to thereby enhance productability.

According to the present invention, it was found that when the fluoropolymer as a processing aid is in a clustered particle form of small particles rather than in a single particle form, the melt fracture elimination time may be reduced and no die buildup may be created even without using an interfacial agent.

To achieve the object, the following means is provided according to the present invention.

The present invention provides a processing aid comprising a fluoropolymer forming clustered secondary particles each having a particle size of 2 μm to 2 mm and being a combination of primary fluoropolymer particles each having a diameter of 0.02 μm to 0.5 μm and formed of a co-polymer of vinylidene fluoride and hexafluoropropylene.

The processing aid further comprises a partitioning agent of one to 20 parts by weight relative to the fluoropolymer of 100 parts by weight and lacks an interfacial agent.

The partitioning agent includes one or more of an inorganic powder with a mean particle size of 0.5 μm to 10 μm or an organic powder with a mean particle size of 1 mm or less. The inorganic powder is one or more species selected from the group consisting of talc, silica, and calcium carbonate, and the organic powder is one or more species selected from the group consisting of an antioxidant, an ultraviolet (UV) absorbent, a flame retardant, a heat stabilizer, a photostabilizer, a metal passivant, an enhancer, a plasticizer, a lubricant, an emulsifier, a pigment, an optical brightener, an antistatic agent, and a foaming agent. In particular, in a case where an inorganic particle is used as the partitioning agent, when the partitioning agent having a bimodal particle distribution by mixing particles with a mean particle size of 0.5 μm to 2 μm and particles with a mean particle size of 5 μm to 10 μm at a weight ratio of 1:0.1 to 0.5 is used, a more remarkable effect of the present invention may be obtained, which is more preferable.

More preferably, when the inorganic powder with a mean particle size of 0.5 μm to 2 μm is A, and the inorganic powder with a mean particle size of 5 μm to 10 μm is B, satisfying of the following Expression 1 is more preferable in terms of obtaining a more remarkable effect of the present invention.

$$4 \text{ μm} \leq B-A \leq 8 \text{ μm} \qquad \text{[Expression 1]}$$

More specifically, a difference between the inorganic powder A with a small mean particle size and the inorganic powder B with a large mean particle size is in a range of 4 μm to 8 μm, and more preferably 5 μm to 7 μm, such that the die buildup creation time may be improved by 50% or more and a die pressure may be decreased by 10% or more.

The present invention also provides a masterbatch for a processing aid including a non-fluorinated melt-processable polymer and a processing aid according to the present invention.

The masterbatch for a processing aid may include a processing aid of 0.5 weight % to 20 weight % and a non-fluorinated melt-processable polymer of 80 weight % to 99.5 weight %.

In addition, the present invention provides a method of extruding a non-fluorinated melt-processable polymer composition, the method comprising: mixing a masterbatch for a processing aid including a processing aid of 0.5 weight % to 20 weight % and a non-fluorinated melt-processable polymer of 80 weight % to 99.5 weight %, and a non-fluorinated melt-processable polymer to obtain extrudate, the processing aid including a fluoropolymer forming clustered secondary particles each having a particle size of 2 μm to 2 mm and being a combination of primary fluoropolymer particles each having a diameter of 0.02 μm to 0.5 μm and formed of a co-polymer of vinylidene fluoride and hexafluoropropylene, and a partitioning agent having a bimodal particle distribution; and cooling and pelletizing the extrudate, in which a non-fluorinated melt-processable polymer composition is extruded and pelletized or processed into various forms such as a film and a sheet.

A content of the processing aid in the processed polymer composition is not particularly limited as long as it is in a range in which physical properties or characteristics of the non-fluorinated melt-processable polymer to be mixed are not impaired, but a processing method in which a content of the processing aid is 50 ppm to 5000 ppm and more preferably 100 to 1000 ppm may be provided.

In addition, the present invention provides a method of preparing a masterbatch, the method comprising mixing the processing aid of 0.5 weight % to 20 weight % and the non-fluorinated melt-processable polymer of 80 weight % to 99.5 weight %.

In the method of preparing a masterbatch, the mixing may be performed at 120° C. to 200° C.

According to the present invention, the processing aid may shorten melt fracture elimination time, delay the creation of die buildup, and decrease extrusion load to thereby enhance productability upon extrusion of the non-fluorinated melt-processable polymer even without use of an interfacial agent. The fluoropolymer processing aid according to the present invention is useful particularly for the extrusion of melt-processable polyolefin. In particular, in a case where the inorganic particle having the bimodal particle distribution is used as the partitioning agent, the melt fracture elimination time is further shortened, the die buildup creation time is decreased, and the extrusion load is further decreased to thereby enhance a remarkable effect of the present invention by overall preferably 20% or more, which is more preferable.

DETAILED DESCRIPTION OF EMBODIMENTS

Figure 1:
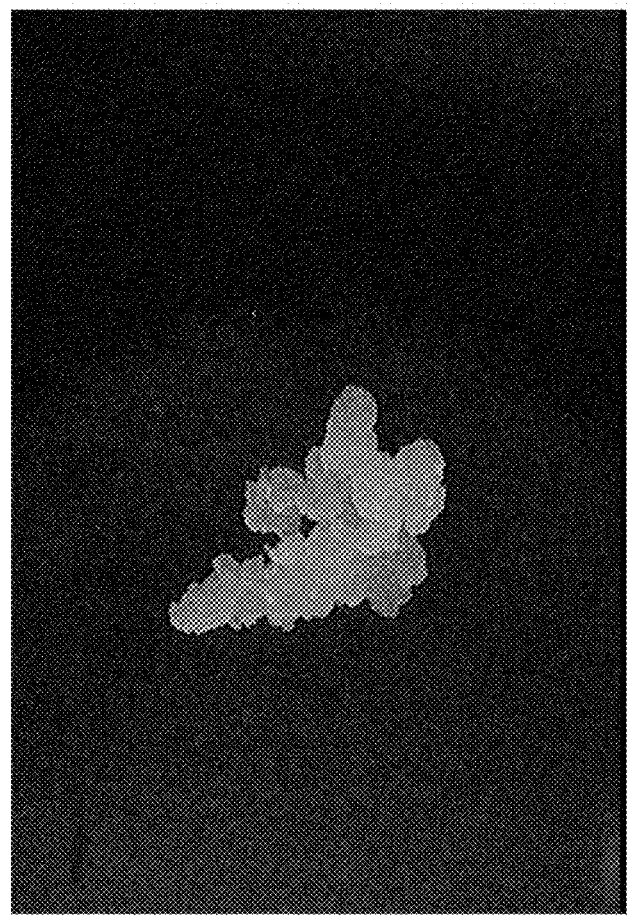
FIG. 1 is a photomicrograph of secondary particles of a fluoropolymer prepared according to a first embodiment of the present invention.

Hereinafter, the present invention is described below in detail.

It has been known that, when a shearing force is applied to the non-fluorinated melt-processable polymer in an extruder while in melt during an extrusion process, the fluorine-based processing aid comes in contact with the die surface to create a lubricant layer, which rids the non-fluorinated polymer of melt fracture.

An interfacial agent included in the processing aid to enhance the processability of non-fluorinated melt-processable polymer may accelerate the elimination of melt fracture elimination, but due to its low pyrolysis temperature, may lead to creation of a carbide and an increase in die-deposit that is a cause of die buildup.

Further, exclusion of the interfacial agent from the processing aid composition may slow down the creation of die buildup but may increase the melt fracture elimination time.

The present invention features the provision of a processing aid that, even without an interfacial agent, may shorten melt fracture elimination time, suppress creation of die buildup, and decrease extrusion load upon process.

According to the present invention, a processing aid includes a fluoropolymer having clustered secondary particles each having a particle size of 2 μm to 2 mm, as formed by the combination of primary fluoropolymer particles each having a diameter of 0.02 μm to 0.5 μm.

The fluoropolymer included in the conventional processing aid is constituted of single particles each having a diameter of 2 mm or less, and upon extrusion, it takes a long time for the fluoropolymer to dissolve and contact the die surface to form a lubricant layer.

By contrast, the processing aid according to the present invention forms clustered secondary particles each of which has a particle size of 2 μm to 2 mm and is a combination of primary fluoropolymer particles each having a diameter of 0.02 μm to 0.5 μm and provides the advantage that a lubricant layer may be formed as the primary particles constituting the clustered secondary particles are readily separated upon extrusion and come in quick contact with the die surface.

Fluorinated monomers that may be co-polymerized to form a proper fluoropolymer include vinylidene fluoride, hexafluoropropylene, chlorotrifluoroethylene, and perfluoroalkyl perfluorovinyl ether. Specific examples of fluoropolymers available include, but are not limited to, vinylidene fluoride, hexafluoropropylene, chlorotrifluoroethylene, 1-hydro-pentafluoropropylene and 2-hydro-pentafluoropropylene or a co-polymer of 1- or 2-hydro-pentafluoropropylene.

According to the present invention, the processing aid may further include a partitioning agent. The partitioning agent may be added to prevent the fluoropolymer particles from adhering together. One to 20 parts by weight of the partitioning agent may be added relative to 100 parts by weight of the fluoropolymer. The partitioning agent may include, but is not limited to, one or more species selected from the group consisting of talc, silica, and calcium carbonate. It is preferable that the partitioning agent is a powder that has a mean particle size of 0.5 μm or more to 10 μm or less. In order to enhance an unexpected effect of the present invention by at least 10% or more, and preferably 20% or more, in a case where an inorganic particle having a bimodal particle distribution is used together with the clustered secondary particles, a more excellent effect of the present invention may be achieved, which is more preferable. In a case where the inorganic particle having bimodal particle distribution is used as the partitioning agent, when the partitioning agent having a bimodal particle distribution by mixing particles with a mean particle size of 0.5 to 2 μm and particles with a mean particle size of 5 to 10 μm at a weight ratio of 1:0.1 to 0.5 is used, a more remarkable effect of the present invention may be obtained, which is more preferable.

According to the present invention, the processing aid may further include, in addition to the partitioning agent, additives, such as an antioxidant, an ultraviolet (UV) absorbent, a flame retardant, a heat stabilizer, a photostabilizer, a metal passivant, an enhancer, a plasticizer, a lubricant, an emulsifier, a pigment, an optical brightener, an antistatic agent, and a foaming agent.

According to the present invention, an organic powder that has a mean particle size of 1 mm or less, as well as an inorganic powder such as talk, silica, or calcium carbonate, may be used as the partitioning agent. The organic powder as used may include one or more species selected from the group consisting of an antioxidant, an ultraviolet (UV) absorbent, a flame retardant, a heat stabilizer, a photostabilizer, a metal passivant, an enhancer, a plasticizer, a lubricant, an emulsifier, a pigment, an optical brightener, an antistatic agent, and a foaming agent as added as the additive.

The present invention also provides a masterbatch.

According to the present invention, the masterbatch includes a processing aid according to the present invention and a non-fluorinated melt-processable polymer. In particular, the masterbatch for processing aids according to the present invention may be put to proper use as a processing aid when forming an olefin-based polymer resin.

In the masterbatch for processing aids according to the present invention, the processing aid is evenly dispersed in an olefin-based polymer. The masterbatch may be added when extrusion-forming an olefin-based polymer resin, enhancing forming processability against a lowering in extrusion torque or extrusion pressure.

It is preferable that the olefin-based polymer is a homopolymer of olefin-based monomers or a co-polymer of olefin-based monomers and alpha olefin co-monomers.

The olefin-based monomer includes, but is not limited to, ethylene, propylene, butene, pentene, hexene, octene, decene, dodecene, tetradecene, hexadecene, octadecene, or eicosene.

The co-monomer used for the co-polymerization may be alpha olefin with a carbon number of 4 or more. The olefin whose carbon number is 4 or more includes, but is not limited to, 1-butene, 1-pentene, 1-hexene, 4-methyl-1-pentene, 1-octene, 1-decene, 1-dodecene, 1-tetradecene, 1-hexadecene, 1-octadecene, or 1-eicosene. Among them, an olefin with a carbon number of 4 to 10 is preferable, and one or several species of alpha olefins together may be used as the co-monomer.

The olefin-based polymer is preferably polyethylene.

According to the present invention, the masterbatch for processing aids is not limited in form to a powder, granules, or pellets, but it is preferably in the form of pellets obtained by melt-mixing.

According to the present invention, the masterbatch for processing aids preferably includes a processing aid of 0.5 weight % to 20 weight % and a non-fluorinated melt-processable polymer of 80 weight % to 99.5 weight %.

According to the present invention, the masterbatch for processing aids may be obtained by blending the processing aid and the non-fluorinated melt-processable polymer with other components as necessary. The other components may include the above-described additives without particularly limited.

According to the present invention, the masterbatch for processing aids may be obtained by mixing the processing aid and the non-fluorinated melt-processable polymer at 120° C. to 200° C.

Specifically, first, a composition ratio is not particularly limited, but, as an example, a masterbatch of the present invention is prepared by mixing the processing aid of 0.5 weight % to 20 weight % and the non-fluorinated melt-processable polymer of 80 weight % to 99.5 weight %. In general, the masterbatch more preferably has a pellet form.

The mixing for preparing the masterbatch is not particularly limited, but is preferably performed at 120° C. to 200° C.

The method of extruding a non-fluorinated melt-processable polymer composition of the present invention may include: mixing a masterbatch for a processing aid including a processing aid of 0.5 weight % to 20 weight % and a non-fluorinated melt-processable polymer of 80 weight % to 99.5 weight %, and a non-fluorinated melt-processable polymer to obtain extrudate, the processing aid including a fluoropolymer forming clustered secondary particles each having a particle size of 2 μm to 2 mm and being a combination of primary fluoropolymer particles each having a diameter of 0.02 μm to 0.5 μm and formed of a co-polymer of vinylidene fluoride and hexafluoropropylene, and a partitioning agent having a bimodal particle distribution; and cooling and pelletizing the extrudate, in which a non-fluorinated melt-processable polymer composition may be extruded and pelletized or processed into various forms such as a film and a sheet.

A content of the processing aid in the processed polymer composition is not particularly limited as long as it is in a range in which physical properties or characteristics of the non-fluorinated melt-processable polymer to be mixed are not impaired, but, for example, in a case where the content of the processing aid is 50 ppm to 5000 ppm and preferably 100 ppm to 1000 ppm, the effect of the present invention may be more achieved, which is more preferable.

The configuration and effects of the present invention are now described in further detail in connection with embodiments thereof. The embodiments are provided merely for illustration of the present invention and the scope of the present invention is not limited thereto.

Preparation Example 1

Figure 2:
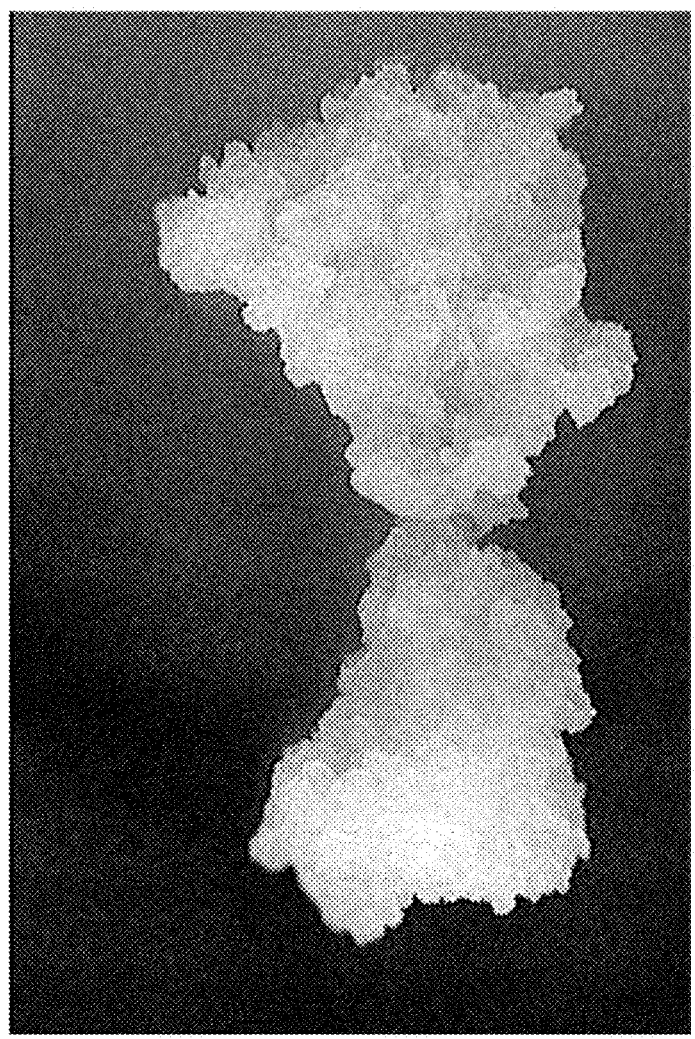
FIG. 2 is a photomicrograph of secondary particles of a fluoropolymer prepared according to a second embodiment of the present invention.

A processing aid was prepared by dry-blending a partitioning agent of 10 weight % and a fluoropolymer of 90 weight % forming clustered secondary particles each having a particle size of 1 mm or less and being a combination of primary fluoropolymer particles each having a diameter of 0.02 μm to 0.5 μm and constituted of a co-polymer of vinylidene fluoride and hexafluoropropylene (a shape of the particle observed with a photomicroscope is shown in FIG. 1). As the partitioning agent, talc (KOCH KC5000) was used. A photomicrograph of the secondary particles of the fluoropolymer is shown in FIG. 2.

Preparation Example 2

A processing aid was prepared by dry-blending a partitioning agent of 10 weight % and a fluoropolymer of 90 weight % forming clustered secondary particles each having a particle size of 2 mm or less and being a combination of primary fluoropolymer particles each with a diameter of 0.02 µm to 0.5 µm and constituted of a co-polymer of vinylidene fluoride and hexafluoropropylene. As the partitioning agent, talc (KOCH KC5000) was used. A photomicrograph of the secondary particles of the fluoropolymer is shown in FIG. 2.

Preparation Example 3

A preparation was performed in the same manner as that of Preparation Example 1, except that a processing aid was prepared by dry-blending a partitioning agent of 3 weight % and a fluoropolymer of 97 weight % forming clustered secondary particles.

Preparation Example 4

A preparation was performed in the same manner as that of Preparation Example 2, except that a partitioning agent of 3 weight % and a fluoropolymer of 97 weight % forming clustered secondary particles were used.

Preparation Example 5

A processing aid was prepared by dry-blending a partitioning agent of 10 weight % and a fluoropolymer of 90 weight % forming clustered secondary particles each having a particle size of 1 mm or less and being a combination of primary fluoropolymer particles each with a diameter of 0.02 µm to 0.5 µm and constituted of a co-polymer of vinylidene fluoride and hexafluoropropylene (a shape of the particle observed with a photomicroscope is shown in FIG. 1). As the partitioning agent, talc in which two types of particles with mean particle sizes of 0.9 µm and 7.5 µm, respectively, were mixed at a weight ratio of 1:0.3 was used.

Preparation Example 6

A preparation was performed in the same manner as that of Preparation Example 5, except that a processing aid was prepared by dry-blending a partitioning agent of 3 weight % having a bimodal particle distribution and a fluoropolymer of 97 weight % forming clustered secondary particles.

Preparation Example 7

A preparation was performed in the same manner as that of Preparation Example 5, except that a processing aid was prepared by dry-blending a partitioning agent of 10 weight % in which two types of particles having mean particle sizes of 0.9 µm and 5 µm, respectively, were mixed at a weight ratio of 1:0.3. As the partitioning agent, talc was used.

Preparation Example 8

A preparation was performed in the same manner as that of Preparation Example 5, except that a processing aid was prepared by dry-blending a partitioning agent of 10 weight % in which two types of particles having mean particle sizes of 0.9 µm and 8.5 µm, respectively, were mixed at a weight ratio of 1:0.3. As the partitioning agent, talc was used.

Preparation Example 9

A preparation was performed in the same manner as that of Preparation Example 5, except that a processing aid was prepared by dry-blending a partitioning agent of 10 weight % in which two types of particles having mean particle sizes of 0.9 µm and 4 µm, respectively, were mixed at a weight ratio of 1:0.3. As the partitioning agent, talc was used.

Preparation Example 10

A preparation was performed in the same manner as that of Preparation Example 5, except that a processing aid was prepared by dry-blending a partitioning agent of 10 weight % in which two types of particles having mean particle sizes of 0.9 µm and 10 µm, respectively, were mixed at a weight ratio of 1:0.3. As the partitioning agent, talc was used.

Comparison Preparation Example 1

Figure 3:
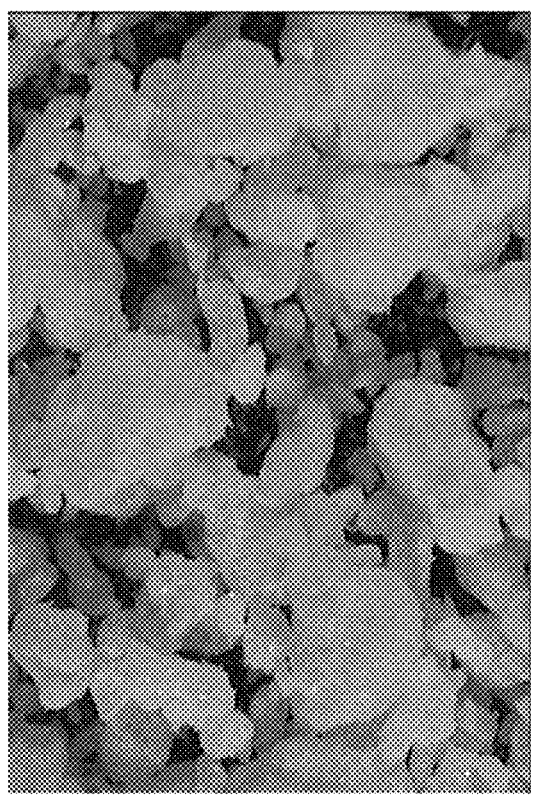
FIG. 3 is a photomicrograph of 3M Dynamar™ FX-9613.

Dynamar™ FX-9613 (a fluoropolymer of 90 weight % and a partitioning agent of 10 weight %), a processing aid of the 3M company, was prepared. A photomicrograph of 3M Dynamar™ FX-9613 is shown in FIG. 3. 3M Dynamar™ FX-9613 shows single particles each having a particle size of 1 mm or less.

Comparison Preparation Example 2

Figure 4:
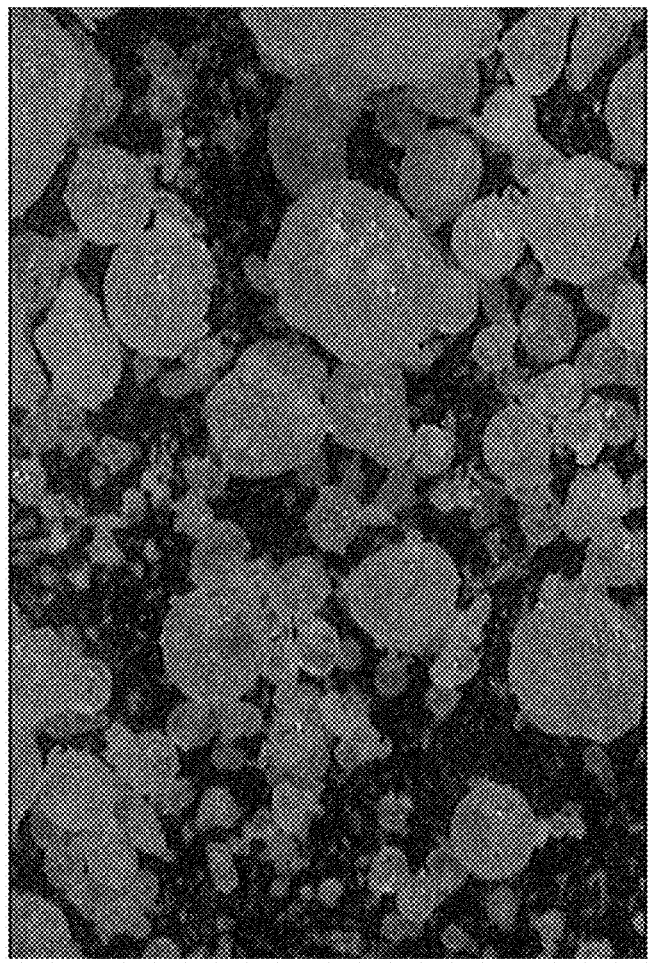
FIG. 4 is a photomicrograph of Daikin DA-810X.

A processing aid available from Daikin, DA-810X (a fluoropolymer of 97 weight % and a partitioning agent of 3 weight %), was prepared. A photomicrograph of Daikin DA-810X is shown in FIG. 4. Daikin DA-810X shows single particles each having a particle size of 2 mm or less.

Comparison Preparation Example 3

A processing aid available from Shine Polymer Technology, 3511N, was prepared. Shine Polymer Technology 3511N includes a fluoropolymer of 50 weight % and an interfacial agent of 50 weight %. Shine Polymer Technology 3511N shows single particles each having a particle size of 2 mm or less.

First to Eighth Embodiments and Comparative Examples 1 to 3

The processing aids according to preparation examples 1 to and comparative examples 1 to 3 were dry-blended with a metallocene linear low-density polyethylene (mLLDPE XP9000 available from Daelim Industrial Co., Ltd.: melt index=0.6 g/10 min; and density=0.935 g/cm$^3$) in the amount as shown in Table 1 and was then melt-mixed at 60 rpm and at 170° C., 200° C., and 200° C. using Brabender Instrument's Plasti-Coder (length/diameter-32/1), and the extruded strand was cooled into pellets in a water container, thereby preparing masterbatches.

Each pellet of the masterbatch and the linear low-density polyethylene were added to Plastograph EC Plus (length/diameter=32/1) equipped with a 80 mm-long and 1.5 mm-diameter die which is Brabender Instrument's single-screw extruder in the amount as shown in Table 1, extrusion was performed at the screw rotation count of 150 rpm, die temperature of 230° C., and cylinder temperature of 170° C., 230° C., and 230° C., the melt fracture elimination time and die buildup creation time were observed, and the die pressure was recorded as shown in Table 1.

For the melt fracture elimination time, the time from when the pellet was put in the hopper—this moment was taken as 0—to when the melt fracture was cleared out to smooth down the overall surface of the formed product was measured by naked eyes and palpation.

Figure 5:
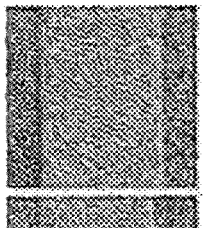
FIG. 5 is a picture illustrating melt fracture elimination times according to the first embodiment, first comparative example, and fifth comparative example.
Figure 6:
FIG. 6 is a picture illustrating die buildup creation times according to a fourth embodiment and fifth comparative example.

A picture illustrating the respective melt fracture elimination times for first embodiment, comparative example 1, and comparative example 5 is shown in FIG. 5. A picture illustrating the respective die buildup formation times for the fourth embodiment and comparative example 5 is shown in FIG. 6.

which is remarkably increased in 50% or more of the die buildup time, whereas the processing aid according to comparative example 3 forms die buildup within 30 minutes due to the interfacial agent included.

Accordingly, the processing aid according to the present invention may shorten melt fracture elimination time and decrease extrusion load to thereby enhance productability upon extrusion despite the exclusion of an interfacial agent. In particular, it can be seen that, in a case where the partitioning agent having a bimodal particle distribution is used, an unexpected remarkable effect may be exhibited.

TABLE 1

|  | Type of processing aid | Processing aid composition (weight %) | | | Processing aid amount (ppm) | Melt fracture elimination time (min.) | Die buildup creation time | Die pressure (bar) |
| --- | --- | --- | --- | --- | --- | --- | --- | --- |
|  |  | Fluoro-polymer | Talc | Interfacial agent |  |  |  |  |
| Embodiment 1 | Preparation Example 1 | 90 | 10 | — | 400 | 10 | 60 min. or more | 80 |
| Embodiment 2 | Preparation Example 2 | 90 | 10 | — | 400 | 20 | 60 min. or more | 85 |
| Embodiment 3 | Preparation Example 3 | 97 | 3 | — | 350 | 15 | 60 min. or more | 80 |
| Embodiment 4 | Preparation Example 4 | 97 | 3 | — | 350 | 20 | 60 min. or more | 90 |
| Embodiment 5 | Preparation Example 5 | 90 | 10 | — | 400 | 7 | 90 min. or more | 70 |
| Embodiment 6 | Preparation Example 6 | 97 | 3 | — | 350 | 11 | 90 min. or more | 72 |
| Embodiment 7 | Preparation Example 7 | 90 | 10 | — | 400 | 8 | 90 min. or more | 71 |
| Embodiment 8 | Preparation Example 8 | 90 | 10 | — | 400 | 8 | 90 min. or more | 71 |
| Embodiment 9 | Preparation Example 7 | 90 | 10 | — | 400 | 9 | 80 min. or more | 75 |
| Embodiment 10 | Preparation Example 8 | 90 | 10 | — | 400 | 9 | 80 min. or more | 76 |
| Comparison Example 1 | Comparison Preparation Example 1 | 90 | 10 | — | 400 | 50 | 60 min. or more | 95 |
| Comparison Example 2 | Comparison Preparation Example 2 | 97 | 3 | — | 350 | 40 | 50 min. or less | 105 |
| Comparison Example 3 | Comparison Preparation Example 3 | 50 | — | 50 | 800 | 30 | 30 min. or less | 90 |

As evident from Table 1 and FIG. 5, the processing aids of preparation examples 1 to 6 according to the first through sixth embodiments show remarkably reduced melt fracture elimination times and lower die pressures as compared with those of the processing aids according to comparative examples 1 and 2. Further, the processing aids according to the first through sixth embodiments may be verified to show shortened melt fracture elimination times as compared with that of the processing aid according to comparative example 3 containing an interfacial agent. Further, it can be seen that the processing aids according to the fifth and sixth embodiments using a partitioning agent having a bimodal particle distribution show a reduction of about 30% in the melt fracture elimination time and a reduction of 10% or more in the die pressure as compared with those of the processing aids according to the first and third embodiments using a partitioning agent having no bimodal particle distribution, such that processability is very excellent.

As evident from Table 1 and FIG. 6, the processing aids according to the first through fourth embodiments cause no die buildup for 60 minutes, and the processing aids according to the fifth and sixth embodiments having a bimodal particle distribution form die buildup of 90 minutes or more, Comparison between the photomicrographs of FIGS. 1 and 2 according to the present invention and the photomicrographs of FIGS. 3 and 4 for those being commercially available is made as follows.

From the photomicrographs of FIGS. 1 and 2, it can be shown that the fluoropolymer particles according to the present invention are clustered secondary particles each having smaller primary particles put together. The processing aid according to the present invention is prepared by dry-blending the clustered secondary particles and a partitioning agent. Dry-blending is a blending process that does not involve external actions, such as heat or pressure, which may deform the clustered secondary particles. Accordingly, the processing aid according to the present invention remains in the form as shown in FIGS. 1 and 2.

From the photomicrographs of FIGS. 3 and 4, on the other hand, the processing aids being commercially available may be verified to be in the form of single particles.

What is claimed is:

1. A method of extruding a non-fluorinated melt-processable polymer composition, the method comprising:
  mixing a masterbatch for a processing aid including a processing aid of 0.5 weight % to 20 weight % and a non-fluorinated melt-processable polymer of 80 weight % to 99.5 weight %, and a non-fluorinated melt-processable polymer to obtain extrudate, the processing aid including a fluoropolymer forming clustered secondary particles each having a particle size of 2 μm to 2 mm and being a combination of primary fluoropolymer particles each having a diameter of 0.02 μm to 0.5 μm and formed of a co-polymer of vinylidene fluoride and hexafluoropropylene, and a partitioning agent having a bimodal particle distribution; and cooling and pelletizing the extrudate.

2. The method of claim 1, wherein a content of the processing aid in the polymer composition is 50 ppm to 5000 ppm.

3. The method of claim 1, wherein the partitioning agent has a bimodal particle distribution by mixing an inorganic powder with a mean particle size of 0.5 μm to 2 μm and an inorganic powder with a mean particle size of 5 μm to 10 μm.

4. The method of claim 3, wherein the inorganic powder A with a mean particle size of 0.5 μm to 2 μm and the inorganic powder B with a mean particle size of 5 μm to 10 μm satisfy the following Expression 1, $$4\ \mu m \leq B - A \leq 8\ \mu m \qquad [\text{Expression 1}]$$

* * * * *